US009066126B2

(12) United States Patent
Moroney et al.

(10) Patent No.: US 9,066,126 B2
(45) Date of Patent: Jun. 23, 2015

(54) REMOTE CONTROL APPARATUS, METHOD AND USER INTERFACE SYSTEM

(75) Inventors: Paul Moroney, La Jolla, CA (US); Glenn D. Altchek, Lawrenceville, NJ (US); Clyde N. Robbins, Maple Glen, PA (US); Apoorv Srivastava, Franklin Park, NJ (US)

(73) Assignee: Google Technology Holdings LLC, Mountain View, CA (US)

( * ) Notice: Subject to any disclaimer, the term of this patent is extended or adjusted under 35 U.S.C. 154(b) by 1094 days.

(21) Appl. No.: 12/960,610

(22) Filed: Dec. 6, 2010

(65) Prior Publication Data

US 2012/0140124 A1 Jun. 7, 2012

(51) Int. Cl.
| | |
|---|---|
| *G05B 11/01* | (2006.01) |
| *G08C 19/16* | (2006.01) |
| *H04N 5/44* | (2011.01) |
| *H04L 17/02* | (2006.01) |
| *G06F 3/00* | (2006.01) |
| *H04N 21/422* | (2011.01) |
| *H04N 21/436* | (2011.01) |
| *H04N 21/443* | (2011.01) |
| *H04N 21/431* | (2011.01) |

(52) U.S. Cl.
CPC ...... *H04N 21/42207* (2013.01); *H04N 21/4312* (2013.01); *H04N 21/43615* (2013.01); *H04N 21/4433* (2013.01)

(58) Field of Classification Search
CPC ........................................................ H04N 7/12
USPC ........................................................ 340/4.3
See application file for complete search history.

(56) References Cited

U.S. PATENT DOCUMENTS

| | | | |
|---|---|---|---|
| 5,812,931 A | 9/1998 | Yuen | |
| 6,160,491 A * | 12/2000 | Kitao et al. | ................. 340/12.28 |
| 6,906,635 B1 * | 6/2005 | Moutaux et al. | ................ 340/4.3 |
| 7,162,733 B2 | 1/2007 | Kamieniecki | |

(Continued)

FOREIGN PATENT DOCUMENTS

GB    2357663    6/2001

OTHER PUBLICATIONS

Boulton, "Sony Intros Google TV Sets from $599 to $1,399", 2 page Article printed from Internet, eweek.com, Oct. 13, 2010.

(Continued)

*Primary Examiner* — Jennifer Mehmood
*Assistant Examiner* — Pameshanand Mahase
(74) *Attorney, Agent, or Firm* — Fish & Richardson P.C.

(57) ABSTRACT

Apparatus forming part of a home entertainment system includes an electronic device having an input accepting a signal corresponding to an externally-generated first user interface, a control module for internally-generating a signal corresponding to a second user interface, and an output for transmitting a combination of the above referenced signals for display. The control module controls an arrangement of display of the first user interface and the second user interface. The apparatus also includes a remote controller for communicating via a two-way communication link with the control module of the electronic device concerning a selection of one of the first user interface and the second user interface. The remote controller having an emitter for emitting control code signals, and the operation of the emitter is controlled by communications received by the remote controller from the control module of the electronic device. A method is also provided.

10 Claims, 4 Drawing Sheets

(56) References Cited

U.S. PATENT DOCUMENTS

| | | | |
|---|---|---|---|
| 7,952,467 B2* | 5/2011 | Hardacker et al. | 340/12.22 |
| 2003/0095211 A1 | 5/2003 | Nakajima | |
| 2003/0192051 A1 | 10/2003 | Yuen | |
| 2004/0233997 A1* | 11/2004 | Umesako | 375/240.26 |
| 2006/0271968 A1* | 11/2006 | Zellner | 725/81 |
| 2007/0052675 A1 | 3/2007 | Chang | |
| 2007/0088812 A1 | 4/2007 | Clark | |
| 2007/0258718 A1 | 11/2007 | Furlong et al. | |
| 2008/0301729 A1 | 12/2008 | Broos et al. | |
| 2010/0053465 A1 | 3/2010 | Rogers | |
| 2010/0081375 A1* | 4/2010 | Rosenblatt et al. | 455/41.1 |

OTHER PUBLICATIONS

Logitech, "Logitech Revue with Google TV", 2 page printout from Internet, logitech.com, Oct. 13, 2010.

Universal Remote Control, Inc., "Universal Remote Control Unveils its MX-6000 Touch Screen Two-Way Remote", 3 page Article printed from Internet, BestStuff.com, Sep. 4, 2008.

* cited by examiner

REMOTE CONTROL APPARATUS, METHOD AND USER INTERFACE SYSTEM

FIELD

A system and method for controlling the operation of multiple different interconnected electronic devices are disclosed, and more particularly, a system and method in which a single remote control device is used to interface and control the operation of different electronic devices forming, for instance, a home entertainment or like multimedia presentation system.

BACKGROUND

By way of example, a system for displaying multimedia content, for instance a home entertainment system or the like, may include several different and separate electronic devices interconnected relative to a monitor having a display screen or the like. The separate electronic devices may include a cable or satellite set-top-box (STB), a video and/or audio player and/or recorder (i.e., CD, MP3, VCR, DVD, DVR, Blu-ray, etc.), an Internet access console, a gaming console, a computer, a surround sound speaker system and like devices which may be connected to a display apparatus such as a high definition television display monitor. Typically, the monitor and each device of the assembled system are provided with its own specially-designed, hand-held, battery-powered, remote controller. If desired, a user can separately interface with and control each device separately via sequential use of different remote controllers.

As an alternative and improvement to using multiple different remote controllers, a so-called programmable universal remote control device can be obtained and used to replace the multiple remotes required to separately control each of the electronic devices. While the programmable universal remote controller provides the convenience of a single remote control device, it tends to complicate the interface function since the universal remote controller is required to be programmed so that it can directly and separately communicate with each of the different targeted electronic devices. Thus, a user must understand how to program the universal remote and how and when to switch between control of different targeted devices for a desired function, and a user must know which specific controls or actions correspond to which of the electronic devices being controlled. Thus, operation of programmable universal remote controls can be confusing for some consumers.

A further example of remotely controlling multiple devices is provided by the use of a so-called infrared (IR) blaster. An IR blaster is typically connected via a flexible cable to a connection port in the rear panel of one electronic device, such as a digital video recorder (DVR), and includes an IR emitter that is positioned a spaced distance in front of a front panel of a second electronic device, such as a set-top-box (STB), for purposes of automatically controlling an operation of the STB. The above referenced positioning of the emitter is required to ensure that the signal emitted from the IR blaster will be properly received by the STB. For example, when a DVR is programmed to record a specific channel at a specific time, the DVR can ensure that an interconnected STB will provide the appropriate channel feed via use of the IR blaster which automatically generates and emits a wireless control signal to the STB at the appropriate time to change the selected channel to that set to be recorded. Drawbacks of IR blasters are that they may be considered cosmetically unappealing due to their required positioning spaced in front of the STB and that they are limited in function.

SUMMARY

This disclosure describes apparatus forming a part of an overall multimedia presentation system, such as a home entertainment system. The apparatus includes an electronic device having a first input for accepting a signal corresponding to an externally-generated first user interface, a control module for internally-generating a signal corresponding to a second user interface, and an output for transmitting a combination of the above referenced signals for display. The control module includes a receiver and transmitter and controls an arrangement of display of the first user interface and the second user interface. The apparatus also includes a remote controller having a receiver and transmitter for communicating via a two-way communication link with the receiver and transmitter of the control module of the electronic device concerning a selection of one of the first user interface and the second user interface. The remote controller has an emitter for emitting control code signals, and the operation of the emitter is controlled by communications received by the remote controller from the control module of the electronic device via the two-way communication link.

This disclosure further describes a method of remotely controlling electronic devices that form at least a part of a multimedia presentation system. A signal corresponding to an externally-generated first user interface is received by a first input of an electronic device, and a signal is internally-generated within the electronic device corresponding to a second user interface. A combination of the above referenced signals is transmitted from the electronic device for display. A command signal is received by a control module of the electronic device from a remote controller when a selection of one of the first user interface and the second user interface is made by the remote controller. When the command signal is a selection of the first user interface, the electronic device sends a return communication signal to the remote controller to automatically cause an emitter of the remote controller to emit a control code signal for controlling the operation of a source device.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
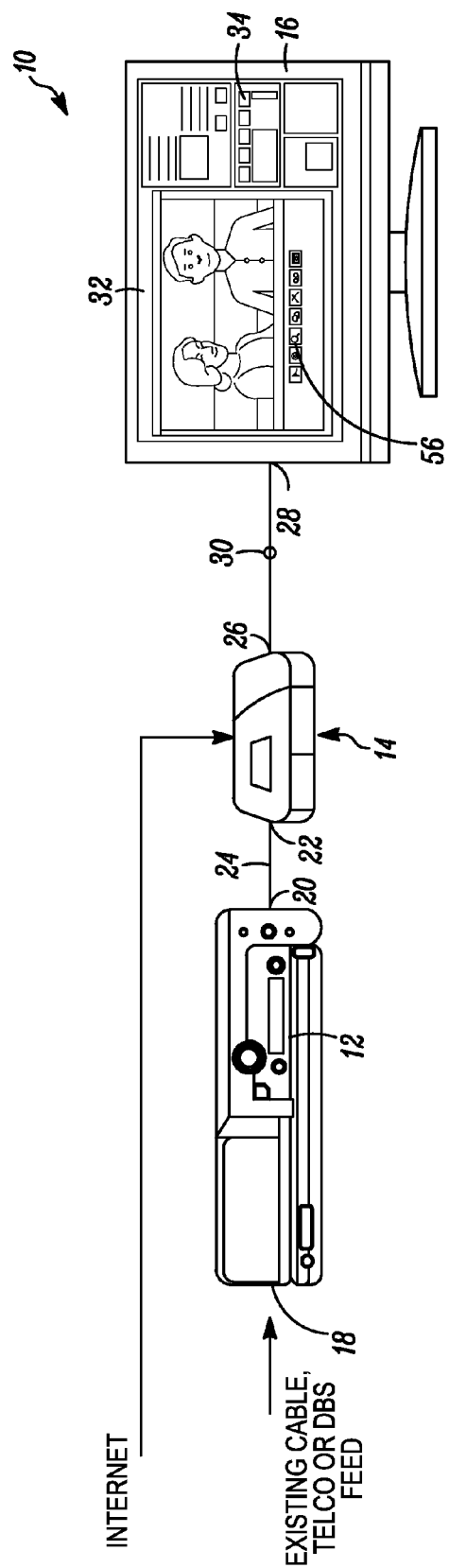
FIG. 1 is a view of an arrangement of separate upstream and downstream electronic devices interconnected to a monitor.

FIG. 1 illustrates an example of an arrangement 10 of multiple electronic devices, 12 and 14, interconnected in an "in-line" configuration to a monitor 16 having a display screen. The devices, 12 and 14, provide different sources of video, audio, or multimedia content for display on the monitor 16, and the arrangement 10 permits the content to be separately and/or simultaneously played and/or displayed on the monitor 16. The content can be stored temporarily or permanently within the devices, 12 and 14, or can be fed or streamed into the devices, 12 and 14, via external wireless communications or via direct cable connections to service provider networks or the like.

In the illustrated arrangement 10, the electronic device 12 is referred to as an upstream device 12 and is connected in-line with the electronic device 14 which can be referred to as a downstream device 14. Only the downstream device 14 is directly connected to the monitor 16. Thus, by definition and arrangement, content provided by the upstream device 12 must be received by and pass through the downstream device 14 before being supplied to the monitor 16. The downstream device 14 is also connected to a source of content different from the upstream device 12 and is able to pass both sources of content to the monitor 16.

By way of example, the downstream device 14 accepts one or more uncompressed high definition video and audio input or inputs from the upstream device 12 and synchronizes it with locally generated video, audio, and graphics signals derived from the downstream device's own network or local storage sources. The downstream device 14 composites these two or more different video, graphics and audio signals provided from different sources and then outputs the combined video and audio signals on one or more high definition uncompressed video and audio outputs. The composite is fed to a monitor 16 whereby two or more different video, graphics and audio signals provided from different sources can be played and/or displayed separately or simultaneously. When displayed simultaneously, the different video and/or graphics from the different sources can be positioned on different regions of the display screen of the monitor or they can be arranged in an at least partly overlying manner.

In one contemplated exemplary embodiment of the arrangement 10, the monitor 16 is a conventional television, such as a high definition flat screen television. Of course, monitor 16 can also be any type of display device or television having any level of definition or high definition and could include, for instance, a computer monitor or the like. The upstream electronic device 12 can be a conventional set-top-box (STB) such as a cable or satellite set-top-box including an input 18, such as an RF input, receiving a feed of television or like programming content from a cable TV, satellite TV, or other service provider. Thus, the multimedia content provided by the upstream device 12 can be uncompressed high definition video and audio signals typically provided for a cable or satellite television broadcast or like programming which can be played and viewed on the monitor 16.

As shown in FIG. 1, the output 20 of the upstream device 12 is connected to an input 22 of the downstream device 14, for instance, via a high definition multimedia interface (HDMI) cable 24 or the like. Thus, the downstream device 14 receives a first "pass-through" source of content via its connection to the upstream device 12 and directly provides or is connected to a second source of content that is different from the pass-through content. For example, the second source of content can be content provided via a connection to the Internet or other network or storage device.

The downstream device 14 can be an Internet access product connected to the Internet via wireless communications or via a connection port in a rear panel of the downstream device 14 and thereby be able to display multimedia content from the Internet on the monitor 16. As shown in FIG. 1, the downstream device 14 has an output 26 that is interconnected to an input 28 of the monitor 16 via a HDMI cable 30 or the like. In this manner, the monitor 16 can display traditional multimedia television content initially received by the upstream device 12 and passed through the downstream device 14 to the monitor 16, multimedia Internet content directly via the downstream device 14, or both simultaneously on different regions of the display screen 32 of the monitor 16 or overlaid on the display screen 32 of the monitor. For purpose of example, see the right and left-hand sides of the display screen 32 as shown in FIG. 1.

Figure 3:
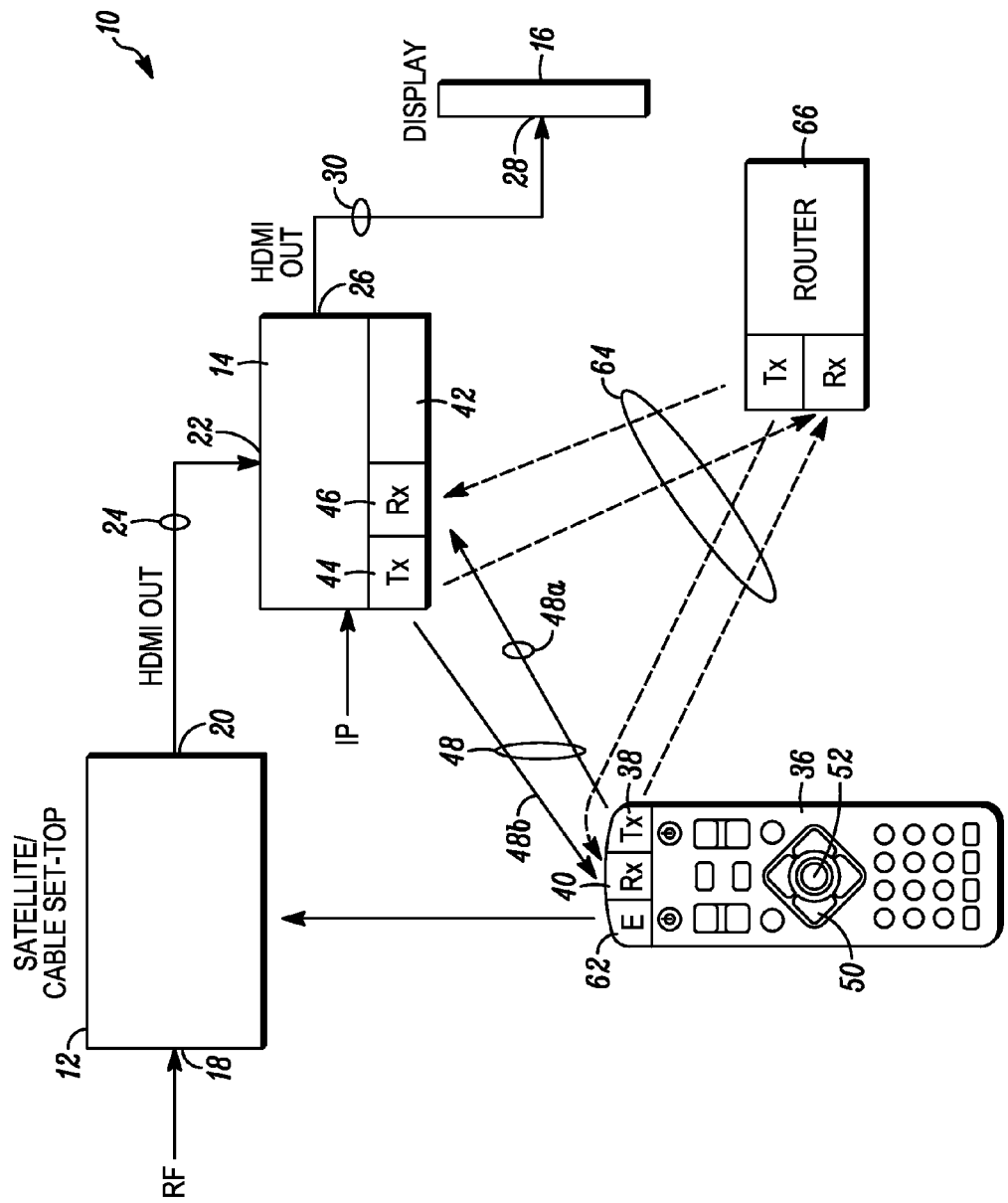
FIG. 3 is a schematic view showing control of the upstream and downstream electronic devices of FIG. 1 with a single universal hand-held, wireless remote controller.

As best shown in FIG. 3, a single hand-held remote controller 36 is used to interface with and control the operation of the upstream and downstream devices, 12 and 14. This is accomplished via interaction of the remote controller 36 with user interface information displayed on the monitor 16. The remote controller 36 may be battery powered and be of any form convenient for use by the end user. While the remote controller device 36 illustrated in FIG. 3 is shown as a remote controller dedicated for sole use with the upstream and downstream devices, 12 and 14, the functionality of device 36 could alternatively be embodied in another device that is not necessarily dedicated for use solely with the upstream and downstream devices, 12 and 14. For instance, the remote control device 36 could be embodied as part of any mobile device such as a cellular or smart-phone, hand held electronic organizer, net-book, lap-top or pad/tablet computer, or any other relatively portable electronic device. For example, the functionality of the remote controller 36 could be implemented as an application on any of the above referenced mobile devices.

Figure 4:
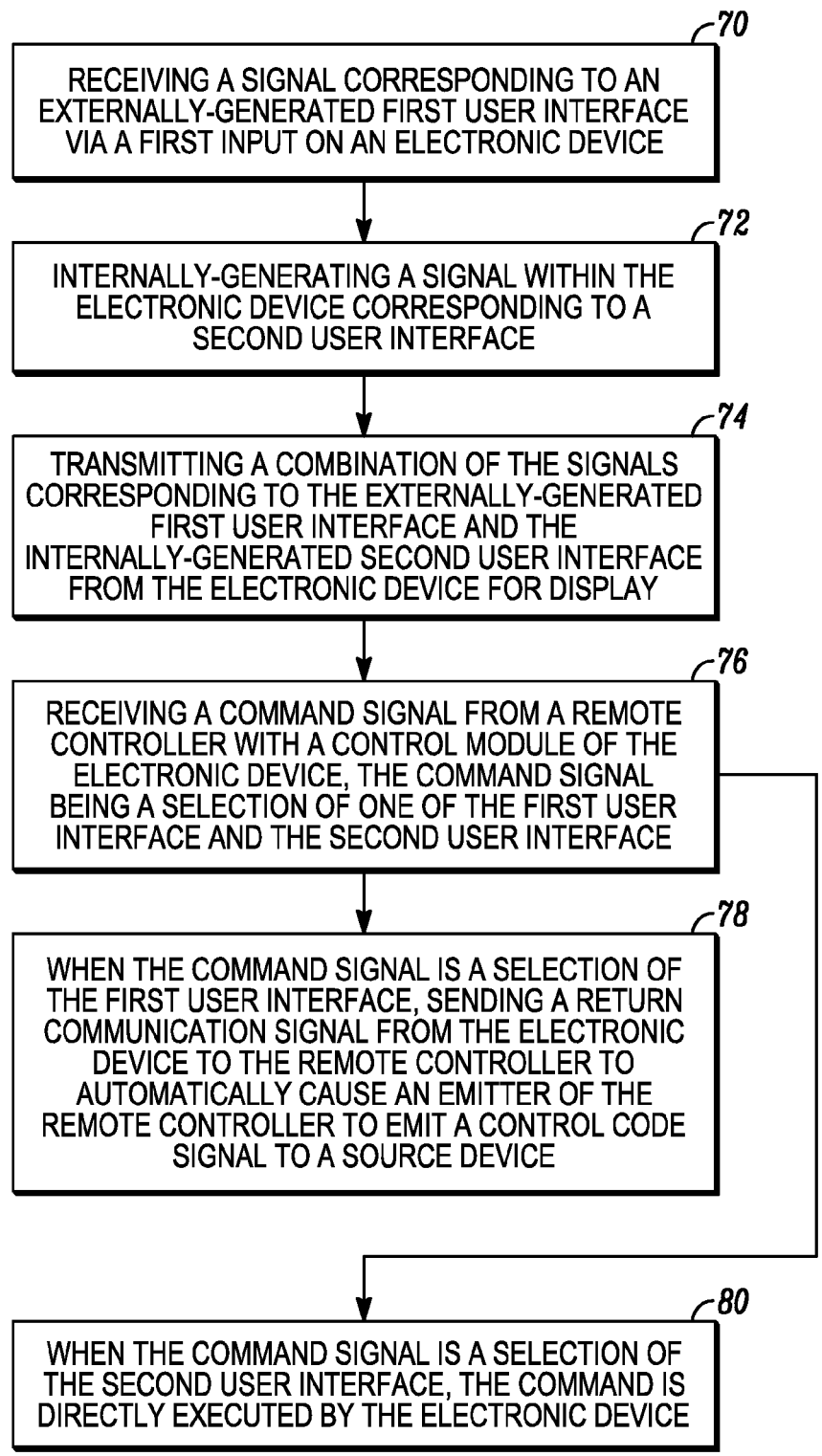
FIG. 4 is a block diagram of process steps for a method of controlling operation of electronic devices forming at least a part of a home entertainment system.

The downstream device 14 provides its internally-generated user interface information 34, such as graphical user interface information, directly to the monitor 16 for being displayed on the control screen 32. For example, see step 72 in FIG. 4. An end user interacts with the user interface information 34 by appropriate manipulation of the remote controller 36. For this purpose, the remote controller 36 can be used to provide a similar function as the keyboard, mouse or other controls typical of a personal computer whereby the end user can control a cursor, highlight a selection and press "enter," point-and-click on a selection, or enter text to navigate a website, an application, or user interface menu.

The remote controller 36 includes a transmitter 38 and a receiver 40 for sending and receiving communication signals directly to and from the downstream device 14, and in turn, the downstream device 14 has a control module 42 with a transmitter 44 and receiver 46 for communicating with the remote controller 36. For reasons to be explained, the communication link 48 between the remote controller 36 and the control module 42 of the downstream device 14 is a two-way communication link 48 including a forward link 48a for communications from the remote controller 36 to the downstream device 14 and a return link 48b for communications from the downstream device 14 to the remote controller 36. Thus, the remote controller 36 can send command or control code signals to the downstream device 14 for actions to be implemented by the downstream device 14, and the downstream device 14 can send commands to the remote controller 36 for actions to be taken by the remote controller 36 as instructed by the downstream device 14 as will be discussed. By way of example, the two-way communication link 48 can be accomplished with a short-range wireless two-way communication link such as provided by Bluetooth wireless technology or like communication technology. By way of further example, an alternate two-way communication link 64 may be established virtually by means of an IP communication protocol. In this case, the transmitter 38 and the receiver 40 of the remote 36 and the transmitter 44 and the receiver 46 of the downstream device 14 establish a communication link 64 through an intermediary local-area-network (LAN) router 66 (see FIG. 3).

Simply for purposes of example, the remote controller 36 can include arrow keys 50 and an "enter" or "select" key 52. See FIG. 3. Thus, a user may navigate through a menu of selection options provided as graphical user interface information 34 displayed on the monitor 16 to permit the user to interactively implement certain permitted functions by appropriate use of the arrow keys 50 of the remote controller 36 to highlight a desired command or option of the graphical user interface information 34. The highlighted command or option is selected when the "enter" or "select" key 52 is pressed. In addition or as an alternative thereto, the remote controller 36 may be provided with a cursor control mechanism, touch pad or the like allowing the user to navigate the options using a movable cursor 54 that is shown on the display screen 32 of the monitor 16 and that is controlled by the remote controller 36, for instance, in a "point-and-click" manner. Still further, the remote controller 36 can include function keys or a keypad of letters permitting text entries to be entered on the monitor 16 via use of the remote controller 36. In all of the above examples, signals are sent from the remote controller 36 and received by the control module 42 of the downstream device 14.

The return link 48b of the two-way communication link 48 is used for purposes of controlling the operation of the upstream device 12. In this arrangement, the downstream device 14 functions as the master and receives user interface information from the upstream device 12 (for instance, see step 70 in FIG. 4). The downstream device 14 controls and mixes two sources of video such that user interface information for both the upstream and downstream devices, 12 and 14, are displayed on the monitor 16. For example, see step 74 in FIG. 4. During a set up procedure, the downstream device 14 is able to ascertain both the make and model of the upstream device 12 (for instance, a STB) and is able to retrieve appropriate control codes for the upstream device 12. In addition, the downstream device 14 determines and controls the size at which video or images, such as user interface information, received from the upstream device 12 is displayed on the monitor 16 and its exact location on the display screen 32. Thus, the downstream device 14 is able to place its own graphical user interface information 34 on the display screen 32 simultaneously with the graphical user interface information 56 of the upstream device 12 and store this information concerning the exact location on the display of each graphical user interface.

By way of example, the user interface information, 34 and 56, can be displayed on different regions of the display screen 32 of the monitor 16 as controlled, known, and stored by the control module 42 of the downstream device 14. For instance, the downstream device 14 can scale and/or reduce the size of the video or user interface 56 that is being passed through the downstream device 14 from the upstream device 12. This is for purposes of ensuring that there is sufficient area on the display screen 32 to add additional information such as interface 34 to the display screen 32 without interfering with the display areas dedicated for the upstream device 12. Thus, the user interface information 34 of the downstream device 14 may be located on a first region 58 of the display screen 32, and the user interface information 56 of the upstream device 12 may be located on a second region 60 of the display screen 32. See FIG. 2. This enables the user to readily interface with the user interface information of the content provided by both of the devices, 12 and 14, in an uncomplicated and user-friendly manner with the single remote controller 36. This is because, when the remote controller highlights or selects a particular graphical user interface or a cursor is located on a specific region of the display screen (see step 76 in FIG. 4), the control module 42 of the downstream device 14 is aware of whether the particular graphical user interface or region is dedicated for controlling the upstream device 12 or whether the particular graphical user interface or region is dedicated for controlling the downstream device 14. After this context is known, the downstream device 14 is able to perform the requested function or oversee that an appropriate control code signal is sent to the upstream device 12.

Figure 2:
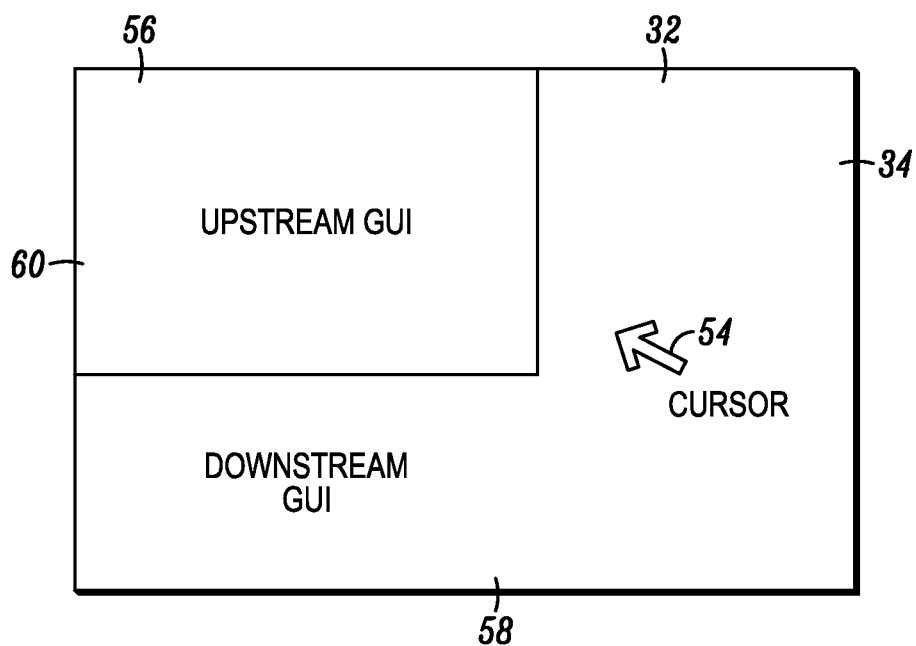
FIG. 2 is a view of a user interface display on the monitor with the graphical user interface of each of the upstream and downstream devices of FIG. 1 occupying different regions on the display.

As best illustrated by the example of FIG. 2, the user interface information 56 of the upstream device 12 is provided in the region 60, for instance, in the upper left-hand corner of the display screen 32 as illustrated, and the user interface information 34 for the downstream device 14 is shown in the region 58, for instance, extending beneath and to the right of the upstream interface information 56. Of course, any display arrangement of graphical user interface information can be used provided that one region of the display is dedicated for control of the upstream device 12 and a different region of the display is dedicated for the control of the downstream device 14. For example, since the downstream device 14 controls the placement of the graphical user interface information from the upstream device 12, the downstream device can arrange or overlay its graphical user interface information anywhere on the display screen 32 provided that one graphical user interface does not interfere with another graphical user interface.

In operation, when the remote controller 36 is used to highlight-and-select and/or point-and-click on a particular graphical user interface feature on the region 60 of the display screen 32 as shown in FIG. 2, this corresponds to a command desired for the upstream device 12. Thus, the remote controller 36 sends a signal to the control module 42 of the downstream device 14 which interprets the command as being a command intended for the upstream device 12. Thereafter, the control module 42 of the downstream device 14 generates and sends an appropriate control code command to the remote controller 36 which is received by the receiver of the remote controller 36 via the return path 48b of the two-way communication link 48. This signal causes the remote controller 36 to automatically emit a one-way communication signal to the upstream device 12. See step 78 in FIG. 4. For example, this may be an IR control signal, RF control signal or the like sent from an emitter 62 mounted within the housing of the remote controller 36. If the remote controller 36 is implemented as an application on a mobile device such as a smart-phone or portable computer, the emitter 62 can be built into the mobile device or can be added onto the device as an external accessory. The upstream device 12 recognizes and receives this control code signal from the emitter 62 of the remote controller 36 and performs the requested action.

Accordingly, the downstream device 14 is responsible for arranging and knowing the location of graphical user interface for both the upstream and downstream devices, 12 and 14, on the monitor 16, for receiving and recognizing a command signal from the remote controller 36, and for determining whether the command is for the downstream device 14 or the upstream device 12. If the command is for the downstream device 14, the downstream device executes the command. See step 80 in FIG. 4. Alternatively, if the command is interpreted by the downstream device 14 as being a command for the upstream device 12, the downstream device 14 generates an appropriate signal sent via the return link 48b to the remote controller 36 which in turn emits the desired control code command from the emitter 62 in the remote controller 36 to the upstream device 12 where it is received and executed. See step 78 in FIG. 4.

Since the upstream and downstream devices, 12 and 14, are typically stacked together (i.e., in a stacked STB and OTT STB configuration), generally aiming the remote controller 36 at the front panel of one of the devices, 12 and 14, effectively causes the remote controller 36 to be directed to properly communicate with both devices, 12 and 14. The commands sent via the two-way communication link and the one-way IR or RF emitter occur in a total amount of time of about 100 milliseconds or less and do not interfere with one another. Thus, they are accomplished in typical expected human interaction time for such a command and before, for instance, a user has the time to place the remote controller 36 down or no longer aim the remote controller 36 at the STB 12.

Examples of commands for the upstream device 12 (i.e. STB) can include power on/off, channel selection, programming guide selection, access of stored video collection, or the like. Commands to change volume, brightness, etc. that are common to the devices, 12 and 14, can be handled solely by the downstream device 14.

In one contemplated mode of operation, the two-way communication link 48 between the remote controller 36 and the downstream device 14 can be normally powered-off to save battery life of the remote controller 36 and can be powered-on only when a button of the remote controller 36 is pressed and for a short period of time thereafter.

In an alternative contemplated mode of operation, the two-way communication link 48 between the remote controller 36 and the downstream device 14 can be powered-on at all times. Thus, when the downstream device 14 detects that the user has highlighted a graphical user interface corresponding to the upstream device 12, the control module 42 can immediately send a signal to the remote controller 36 so that when a button on the remote controller 36 is eventually pressed by the end user to select an option, the remote controller 36 is automatically set to generate a signal via the one-way IR or RF emitter 62 to the upstream device 12. Thus, the remote controller 36 is provided with this information ahead of an "enter" or "select" button being pressed.

The above described system and method enables the use of a single remote controller to control multiple electronic devices of a home entertainment or like system in a manner convenient and uncomplicated to the end user. The remote controller can establish a two-way communication link with the downstream device and a one-way communication link with the upstream device. Since the downstream device determines the layout pattern of graphical user interface displayed on the monitor, the downstream device knows the context and state of user interaction with the graphical user interface and is able to interpret whether a particular command is intended for the downstream device or the upstream device. Thus, the downstream device functions as the master in this arrangement and can cause the remote controller to issue an appropriate command to the upstream device, as needed. The remote controller can be dedicated for use with the upstream and downstream devices or it can be implemented as an application on a mobile device such as a smart-phone or portable computer that includes the required hardware, such as an emitter, discussed above.

In the above examples, the combination provides a conventional STB as the upstream device and an Internet access product as the downstream device. However, the upstream and downstream devices can embody any type of home entertainment product or the like such as different types of media players, recorders, storage units, network interconnectors, computers, gaming consoles, and the like. As another alternative, the downstream device can be formed as an integral part of the monitor or television.

While the principles of the invention have been described above in connection with specific devices, systems, and methods, it is to be clearly understood that this description is made only by way of example and not as limitation on the scope of the invention as defined in the appended claims.

We claim:

1. A method of remotely controlling electronic devices that form at least a part of a multimedia presentation system, comprising:
   generating, by a first electronic device having a remote controller, a first user interface for control of the first electronic device;
   receiving, at a first video input of the first electronic device, an input video signal representing a second user interface generated by a second electronic device for control of the second electronic device;
   generating, by the first electronic device, an output video signal that represents a combination of the first user interface and the second user interface;
   transmitting, by the first electronic device at a video output of the first electronic device, the output video signal for simultaneous display of the first user interface and the second user interface on a display device;
   receiving, by the first electronic device, command signals from a remote controller of the first electronic device, each command signal in a first signal format for the first electronic device;
   for each command signal, determining, by the first electronic device, whether the first command signal represents an interaction with either the first user interface or the second user interface;
   for each command signal determined to be representing an interaction with the first user interface, executing an operation corresponding to the command and the first user interface by the first electronic device; and
   for each command signal determined to be representing an interaction with the second user interface, sending, by the first electronic device a second command signal from the first electronic device to the remote controller that causes the remote controller to emit, in response to the second command signal, a third command signal in a second signal format of the second electronic device, the second signal format being different from the first signal format.

2. The method of claim 1, further comprising using the first electronic device to control an arrangement of display of the first user interface and the second user interface.

3. The method of claim 1, wherein determining whether the first command signal represents an interaction with either the first user interface or the second user interface is based on a determination of a display location selected by the remote controller and communicated to the first electronic device.

4. The method of claim 1, wherein said receiving command signals from the remote controller and sending the second command signal from the first electronic device to the remote controller is via two-way short-range wireless communication link, and wherein the second signal is emitted via an IR or RF emitter emitting a directional wireless signal.

5. The method of claim 1, further comprising obtaining and storing information concerning make, model and control codes for the second electronic device in the first electronic device.

6. The method of claim 1, wherein the second electronic device is a set-top box connected to the first electronic device upstream from a connection to the display device, and wherein the set-top-box provides television multimedia content for display on the display device, the first electronic device provides Internet multimedia content for display on the display device, said first user interface corresponds to controlling operation of the first electronic device, and the second user interface corresponds to controlling operation of the second electronic device.

7. The method of claim 1, wherein said remote controller is a mobile device selected from the group consisting of a device not dedicated for sole use as a remote controller, a cellular phone, a smart-phone, a pad computer, a tablet computer, a laptop computer, a net book computer, and an electronic personal organizer.

8. The method of claim 1, wherein at least one of the input video signal and the output video signal comprises uncompressed high definition video and audio signals.

9. The method of claim 1, wherein at least one of the input video signal and the output video signal comprises a high definition multimedia interface (HDMI) signal.

10. A system, comprising:
a first electronic device including a processing device, an input/output subsystem including a video input and a video output, and a memory device storing instructions executable by the processing device and that upon execution cause the processing device to perform operations comprising:
generating a first user interface for control of the first electronic device;
receiving, at the first video input of the first electronic device, an input video signal representing a second user interface generated by a second electronic device for control of the second electronic device;
generating an output video signal that represents a combination of the first user interface and the second user interface;
transmitting at the video output, the output video signal for simultaneous display of the first user interface and the second user interface on a display device;
receiving over the input/output subsystem command signals from a remote controller for the first electronic device, each command signal in a first signal format for the first electronic device;
for each command signal, determining, by the first electronic device, whether the first command signal represents an interaction with either the first user interface or the second user interface;
for each command signal determined to be representing an interaction with the first user interface, executing an operation corresponding to the command and the first user interface by the first electronic device; and
for each command signal determined to be representing an interaction with the second user interface, sending a second command signal from the first electronic device to the remote controller that causes the remote controller to emit, in response to the second command signal, a third command signal in a second signal format of the second electronic device, the second signal format being different from the first signal format.

* * * * *